US012811482B2

(12) United States Patent
Renedo Anglada et al.

(10) Patent No.: US 12,811,482 B2
(45) Date of Patent: Nov. 24, 2026

(54) CONSEQUENT POLE SUPERCONDUCTING SYNCHRONOUS MACHINES

(71) Applicant: General Electric Renovables Espana, S.L., Barcelona (ES)

(72) Inventors: Jaime Renedo Anglada, Niskayuna, NY (US); Michael Parizh, Niskayuna, NY (US); David Allan Torrey, Galway, NY (US); Nidhishri Tapadia, Arvada, CO (US); Anbo Wu, Clifton Park, NY (US)

(73) Assignee: GE Vernova Renovables Espana, S.L., Barcelona (ES)

( * ) Notice: Subject to any disclaimer, the term of this patent is extended or adjusted under 35 U.S.C. 154(b) by 214 days.

(21) Appl. No.: 18/717,037

(22) PCT Filed: Dec. 7, 2021

(86) PCT No.: PCT/US2021/062091
§ 371 (c)(1),
(2) Date: Jun. 6, 2024

(87) PCT Pub. No.: WO2023/107095
PCT Pub. Date: Jun. 15, 2023

(65) Prior Publication Data

US 2025/0047185 A1 Feb. 6, 2025

(51) Int. Cl.
*H02K 55/04* (2006.01)
*F03D 9/25* (2016.01)
(Continued)

(52) U.S. Cl.
CPC ............... *H02K 55/04* (2013.01); *F03D 9/25* (2016.05); *F03D 13/201* (2023.08); (Continued)

(58) Field of Classification Search
CPC ........ H02K 55/04; H02K 7/1838; H02K 1/26; F03D 9/25; F03D 13/201; F05B 2220/706;
(Continued)

(56) References Cited

U.S. PATENT DOCUMENTS

| | | | | |
|---|---|---|---|---|
| 6,489,701 B1 * | 12/2002 | Gamble | .................. | H02K 3/24 310/55 |
| 10,601,298 B2 | 3/2020 | Buhrer et al. | | |

(Continued)

FOREIGN PATENT DOCUMENTS

| | | |
|---|---|---|
| DE | 19943783 A1 | 3/2001 |
| DE | 102011005217 A1 | 9/2012 |

(Continued)

OTHER PUBLICATIONS

PCT International Search Report Corresponding to PCT/US2021/062091 on Jul. 7, 2022.

(Continued)

*Primary Examiner* — Tulsidas C Patel
*Assistant Examiner* — Mohammed Ahmed Qureshi
(74) *Attorney, Agent, or Firm* — Dority & Manning, P.A.

(57) ABSTRACT

A superconducting machine includes a main shaft, an armature with at least one armature winding arranged with respect to the main shaft, a carrier structure arranged circumferentially around the main shaft and defining a circumferential exterior surface, and a plurality of superconducting coils secured to the circumferential exterior surface. Each of the plurality of superconducting coils has a first common polarity. The superconducting machine further includes a void space between each of the plurality of superconducting coils. Further, each void space has a second common polarity which is in opposition of the first common polarities of the superconducting coils.

17 Claims, 11 Drawing Sheets

(51) Int. Cl.
*F03D 13/20* (2016.01)
*H02K 7/18* (2006.01)

(52) U.S. Cl.
CPC ...... *H02K 7/1838* (2013.01); *F05B 2220/706* (2013.01); *F05B 2240/912* (2013.01)

(58) Field of Classification Search
CPC .... F05B 2240/912; Y02E 10/72; Y02E 40/60; Y02E 10/727; Y10S 505/876
See application file for complete search history.

(56) References Cited

U.S. PATENT DOCUMENTS

| | | | | |
|---|---|---|---|---|
| 2015/0018219 | A1* | 1/2015 | Umemoto | H02K 1/32 310/194 |
| 2016/0380516 | A1 | 12/2016 | Tomsic et al. | |
| 2020/0169158 | A1 | 5/2020 | Buhrer et al. | |
| 2021/0143694 | A1 | 5/2021 | Arndt | |
| 2021/0270239 | A1* | 9/2021 | Torrey | H02K 7/1838 |

FOREIGN PATENT DOCUMENTS

| | | | |
|---|---|---|---|
| EP | 3186505 | A1 | 7/2017 |
| EP | 3384585 | B1 | 10/2018 |
| JP | 2005-304215 | A | 10/2005 |
| JP | 2018-007480 | A | 1/2018 |

OTHER PUBLICATIONS

Siskind, A New 2-Speed Consequent-Pole Polyphase Induction-Motor Winding, Transactions of the American Institute of Electrical Engineers, Part III: Power Apparatus and Systems, vol. 76, No. 3, Apr. 1957, pp. 665-668. (Web Link Only) https://ieeexplore.ieee.org/document/4499634.

Tapia et al., Consequent-Pole Permanent-Magnet Machine with Extended Field-Weakening Capability, IEEE Transactions on Industry Applications, vol. 39, No. 6, Nov.-Dec. 2003, pp. 1704-1709. (Abstract Only) https://www.semanticscholar.org/paper/Consequent-pole-permanent-magnet-machine-with-Tapia-Leonardi/084e8998affc07d14125bc6b88ec3c8a34561f00.

* cited by examiner

CONSEQUENT POLE SUPERCONDUCTING SYNCHRONOUS MACHINES

STATEMENT REGARDING FEDERALLY SPONSORED RESEARCH OR DEVELOPMENT

This invention was made with U.S. government support under DE-EE0008787 awarded by the U.S. Department of Energy. The U.S. government may have certain rights in the invention.

RELATED APPLICATION

The present application claims priority to PCT Application Serial Number PCT/US2021/062091, filed Dec. 7, 2021, which is incorporated by reference herein in its entirety.

FIELD

The present disclosure relates generally to superconducting machines, and more particularly to consequent pole superconducting machines.

BACKGROUND

Generally, superconducting rotating machines, such as superconducting generators and motors (collectively as electric machines), include a plurality of superconducting coils for generating a static or rotating magnetic field and at least one armature coil for generating a rotating magnetic field or a stationary magnetic field in relation to the motion of the armature that interacts with the field from the superconducting coils. Further, superconducting rotating machines are made by constructing field coils (which typically carry a direct current) of a superconducting material ("superconductor") instead of the normally-conducting material with an electrical resistance (e.g., copper, aluminum, etc.). The current-carrying capacity of superconducting materials in their superconducting state is typically over an order of magnitude higher than that of traditional conductors such aluminum or copper at room temperature, particularly in DC operation or low frequency. Thus, the use of superconductors in power applications, such as wind turbine generators, provides numerous benefits, such as more efficient performance, non-gearbox direct drive operation, potentially reduced manufacturing and installation costs, and lower generator weight as a result of the stronger magnetic fields requiring less ferromagnetic material to direct the magnetic fields. Such benefits are particularly useful for offshore wind turbine applications.

In general, superconducting rotating machines typically take advantage of alternating magnetic polarities established by the superconducting field coils. That is, north poles are located between south poles to create a regular north, south, north, south, etc. field pattern. These alternating polarities are generated by relying on superconducting field windings made of superconductors which conduct current in opposing directions. The magnetic fields generated by the field coils interact with the magnetic poles of the armature coil(s) to create torque. Torque is produced by the interaction of two magnetic fields trying to align. The magnitude of the torque is tied to the strength of the magnetic fields and radius at which they interact. For steady motion, the two magnetic fields must move at the same speed. This is accomplished by making one magnetic field travel in space using windings that carry alternating currents. In the superconducting machines described herein, the field windings carry DC current. The armature windings carry alternating currents, the frequency of which is set by the relative motion of the stationary and rotating members. The magnetic field produced by the field coils improves the torque density of the machine, owing to the much higher current-carrying capability of superconducting wires.

However, mechanical interactions can occur as a result of placing superconducting coils in close proximity to each other in efforts to maximize torque density of the machine. The mechanical interactions between superconducting coils are tied to the proximity of the coils. The mechanical interactions among superconducting coils are substantially larger than the interactions between superconducting and armature coils because of proximity and field strength. As a result of this, manufacturers seek to find means for reducing mechanical interactions between superconducting coils.

Thus, the industry is continuously seeking new and improved superconducting machines that address the aforementioned issues. Accordingly, the present disclosure is directed to an air-cored consequent pole superconducting machine.

BRIEF DESCRIPTION

Aspects and advantages of the disclosure will be set forth in part in the following description, or may be obvious from the description, or may be learned through practice of the disclosure.

In one aspect, the present disclosure is directed to a superconducting machine. The superconducting machine includes a main shaft, an armature with at least one armature winding arranged with respect to the main shaft, a carrier structure arranged circumferentially around the main shaft and defining a circumferential exterior surface, and a plurality of superconducting coils secured to the circumferential exterior surface. Each of the plurality of superconducting coils has a first common polarity. The superconducting machine further includes a void space between each of the plurality of superconducting coils. Further, each void space has a second common polarity which is in opposition of the first common polarity of the superconducting coils. The second common polarity is a consequence of the conservation of magnetic flux and is therefore generally referred to herein as a consequent pole.

In further embodiments, the first common polarity of the plurality of superconducting coils may be a north pole, whereas the second common polarity of the void space may be a south pole or vice versa.

In additional embodiments, each of the plurality of superconducting coils defines an arcuate cross-sectional shape. For example, in an embodiment, the arcuate cross-sectional shape(s) may be a circle, an oval, or a racetrack shape. Thus, in an embodiment, the racetrack shape may define opposing curved ends with parallel straightaway side portions.

In particular embodiments, the parallel straightaway side portions of the racetrack shape may be evenly spaced from each other. In another embodiment, the straightaway side portions of adjacent racetrack shaped superconducting coils may be evenly spaced from each other. In still another embodiment, the straightaway side portions of adjacent superconducting coils may be unevenly spaced from each other.

In particular embodiments, the void spaces between each of the plurality of superconducting coils are free of ferromagnetic material or other coils that would modify the field of the superconducting coils. In another embodiment, the void space may be a vacuum or may simply contain air.

In other embodiments, each of the plurality of superconducting coils may include a specific number of Ampere-turns, such number of Ampere-turns being a parameter of the magnetic design. As used herein, for example, the number of Ampere-turns is generally a product of the conductor current and a turn count in the turn. In such embodiments, the number of Ampere-turns may depend on the size of the superconducting coil, the current intended to flow through the wire, and/or the magnetic field to be produced by the superconducting coil, with the number of the superconducting coils being another parameter of the magnetic design.

In another aspect, the present disclosure is directed to a method of assembling a superconducting rotating machine. The method includes providing a main shaft. The method also includes coupling an armature to the main shaft with the armature having at least one armature winding. Further, the method includes placing a carrier structure around the main shaft and the armature. Moreover, the method includes coupling at least one superconducting coil on a circumferential exterior surface of the carrier structure, wherein the superconducting coil(s) has a first common polarity. Thus, the method further includes providing a void space adjacent to the superconducting coil(s) on the circumferential exterior surface of the carrier structure. As such, the void space contains a consequent, opposing second polarity to the first polarity of the superconducting coil(s).

In yet another aspect, the present disclosure is directed to a wind turbine. The wind turbine includes a tower, a nacelle mounted on the tower, a rotor coupled to the nacelle and having a rotatable hub and at least one rotor blade secured to the rotatable hub, and a superconducting generator. The superconducting generator includes a main shaft, an armature with at least one armature winding arranged with respect to the main shaft, a carrier structure arranged circumferentially around the main shaft and defining a circumferential exterior surface, a plurality of superconducting coils secured to the exterior surface with each superconducting coil having a first common polarity, and a void space between each of the superconducting coils. Further, each void space has a second common polarity in opposition of the first common polarity.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
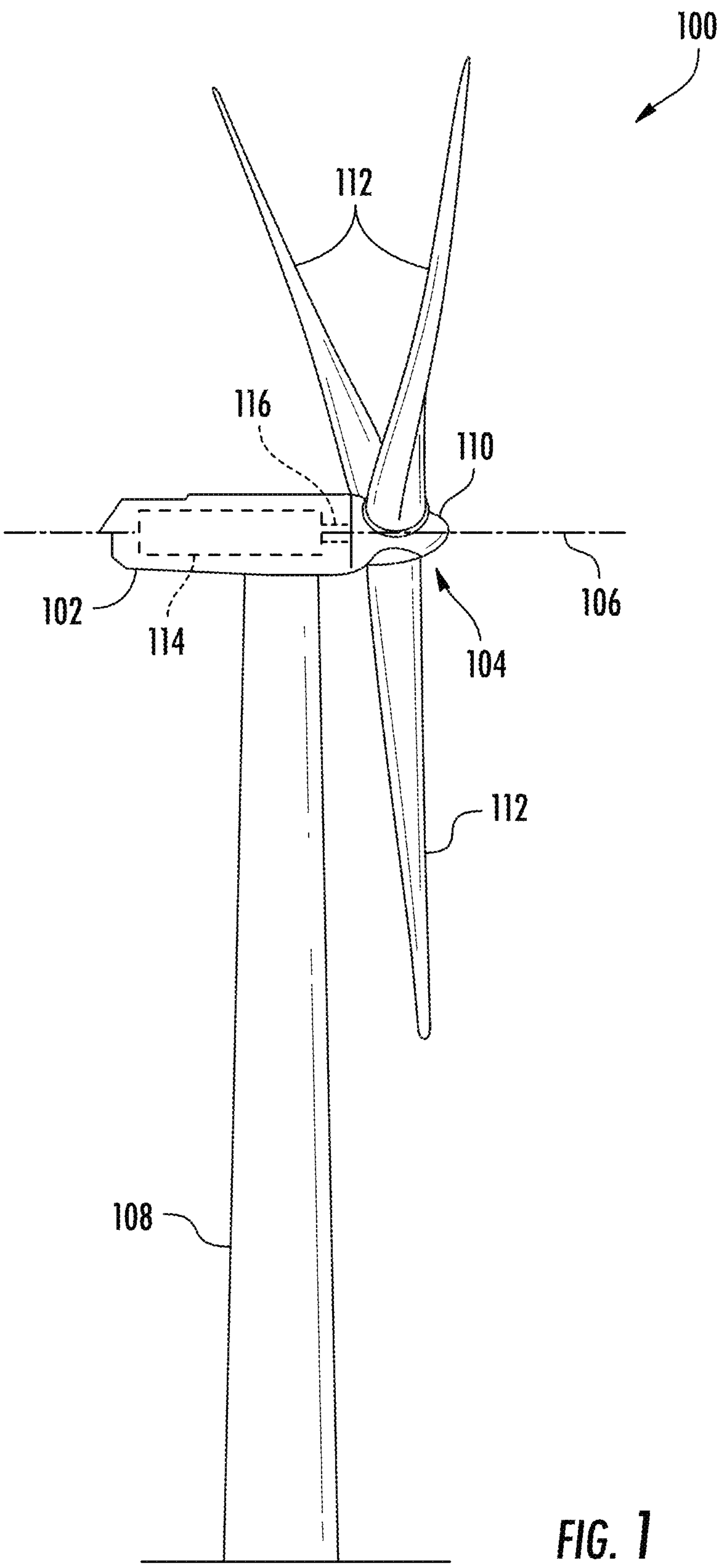
FIG. 1 illustrates a side, perspective view of an embodiment of a wind turbine with a superconducting generator according to the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms “first”, “second”, and “third” may be used interchangeably to distinguish one component from another and are not intended to signify location or importance of the individual components.

The terms “coupled,” “fixed,” “attached to,” and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, the present disclosure is directed to an energy conversion system, such as a wind turbine power system, that includes an electric machine, such as a superconducting generator. The present disclosure is described herein with reference to a superconducting generator in general, and more particularly to a wind turbine superconducting generator, but is not limited to superconducting generators. For example, the present disclosure is directed to a generator that includes an armature and a field each having windings. Furthermore, one element (either the armature or the field) rotates (the rotor) and the other element is stationary (the stator). The superconducting generator may further include coils placed on a circumferential surface of a carrier structure, with the coils having a first common polarity. In placing the coils, the superconducting generator may further include a void space between each of the coils. By placing the coils this way, a second common polarity may be implicitly created within the void spaces that exists between each of the coils.

Thus, an advantage of the present disclosure with respect to a conventional configuration is to reduce mechanical interactions which can result by placing superconducting coils or armature coils too close to each other because the coils are no longer in such close proximity. Such mechanical interactions occur because the superconducting coils carry significantly higher currents and experience higher magnetically-generated forces therebetween. Another advantage is increasing the number of allowable geometries of superconducting coils as a result of the increased distance between superconducting coils. Still another advantage is a reduction of the expense in producing generators incurred as a result of the high cost of superconducting wire required to support a machine of a given rating because the total number of superconducting coils is reduced to half the number of poles. Utilizing a plurality of superconducting coils and a void space between each of the plurality of superconducting coils as described herein according to the present disclosure provides, at least, the aforementioned advantages.

Referring now to the drawings, FIG. 1 illustrates a side, perspective view of an embodiment of a wind turbine 100 having a superconducting generator 114 according to the present disclosure. As shown, the wind turbine 100 generally includes a tower 108 extending from a support surface, a nacelle 102 mounted on the tower 108, and a rotor 104 coupled to the nacelle 102. The rotor 104 includes a rotatable hub 110 and at least one rotor blade 112 (three are shown) coupled to and extending outwardly from the hub 110. Each rotor blade 112 may be spaced about the hub 110 to facilitate rotating the rotor 104 about an axis of rotation 106 to enable kinetic energy to be transferred from the wind into usable mechanical energy, and subsequently, electrical energy. For this purpose, the rotor 104 is coupled to a generator 114 via a shaft (not shown). For purposes of the present disclosure, the generator 114 is a direct drive superconducting generator.

Figure 2:
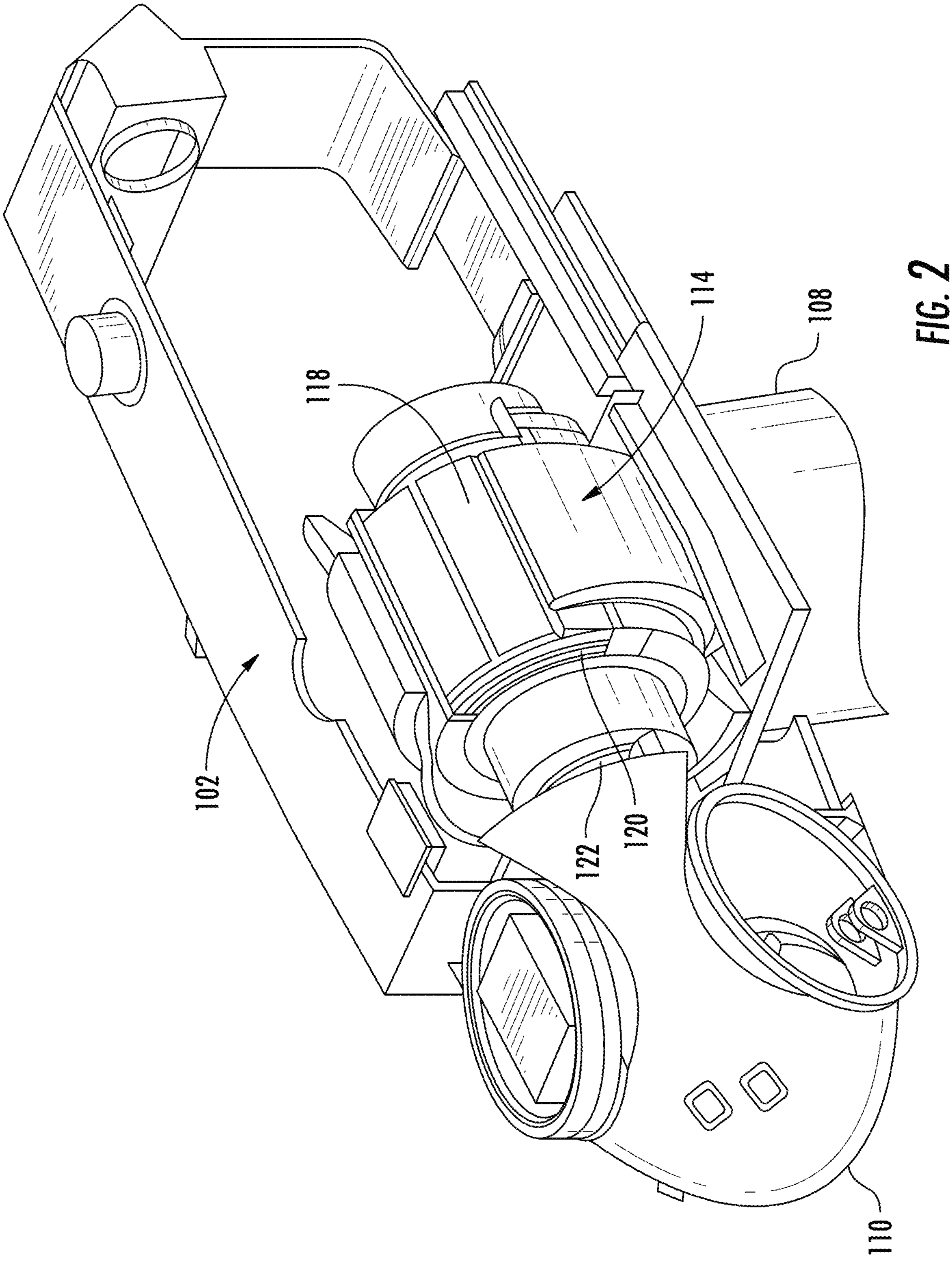
FIG. 2 illustrates an internal, perspective view of an embodiment of a nacelle of the wind turbine of FIG. 1, particularly illustrating a superconducting generator housed in the nacelle according to the present disclosure.

Referring now to FIG. 2, a simplified, internal view of an embodiment of the nacelle 102 of the wind turbine 100 shown in FIG. 1 is illustrated according to the present disclosure. As shown, the generator 114 is housed within the nacelle 102 and includes a field assembly 120 and an armature 118. Moreover, as shown, the generator 114 is generally coupled to the rotor 104 for producing electrical power from the rotational energy generated by the rotor 104. For example, as shown in the illustrated embodiment, the rotor 104 may include a rotor shaft 122 coupled to the hub 110 for rotation therewith. The rotor shaft 122 may, in turn, be rotatably coupled to a armature 118 of the generator 114. As is generally understood, the rotor shaft 122 may provide a torque input to the armature of the generator 114 in response to rotation of the rotor blades 112 and the hub 110.

In an embodiment, electrical power may then be generated using the commonly known principles of induction by applying a torque input to the armature 118 of the generator 114. The armature 118 may then spin within a magnetic field provided by the field assembly 120 of the generator 114 (e.g., in an internal rotor configuration).

However, in other embodiments, the outer component may be the armature 118 of the generator 114, and the inner component may be the field assembly 120 of the generator 114 (e.g., in an external rotor configuration). Further, as shown, additional space may be defined between the outer component and the inner component so as to allow movement (e.g., rotation) therebetween. In other embodiments, it should be understood that the armature 118 may also be the stationary element operating within a rotating magnetic field established by rotation of the field winding.

Figure 3:
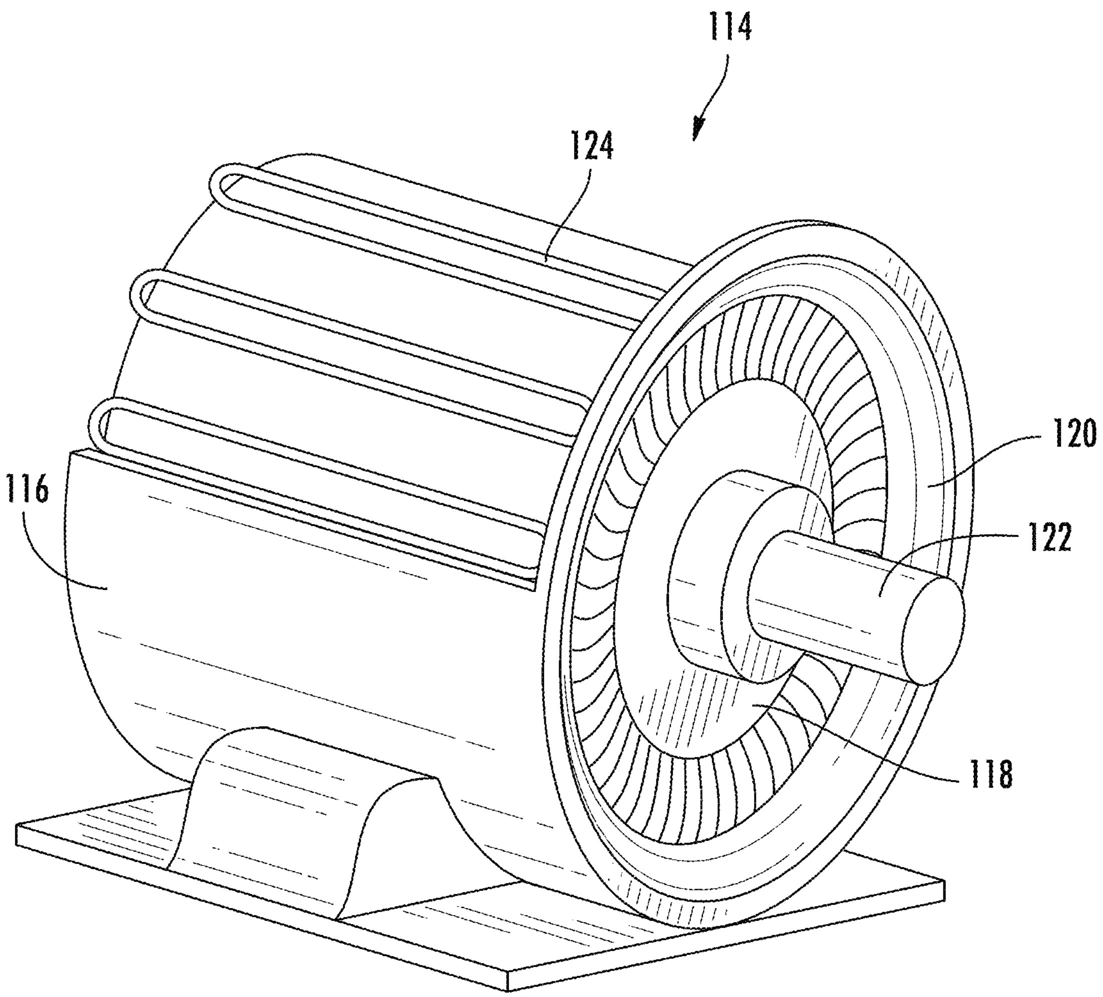
FIG. 3 illustrates a cross-sectional view of an embodiment of a superconducting generator according to the present disclosures.

Further, referring to FIG. 2, the magnetic field generated by the armature 118 is due to the magneto-motive force (MMF) setup by the current which flows through the armature 118 (as shown in FIGS. 2 and 3). The MMF has both spatial and temporal harmonics associated with it due to the discretization of the coils and the magnetic saturation within the steel structures.

Referring now to FIG. 3, a cutaway, perspective view of an embodiment of the generator 114 according to the present disclosure is provided. In particular, as shown, the generator 114 may include a housing 116 for housing the internal components thereof, e.g., such as the armature 118 described herein that may be secured to the rotor shaft 122 and the field assembly 120 that may be secured to the stationary housing 116. Moreover, as shown, the superconducting generator 114 may also include at least one winding set. For example, as shown, the winding set(s) may include one or more current carrying conductors formed into coils 124 that may be attached to a carrier structure, such as the armature 118 or the field assembly 120.

Figure 4:
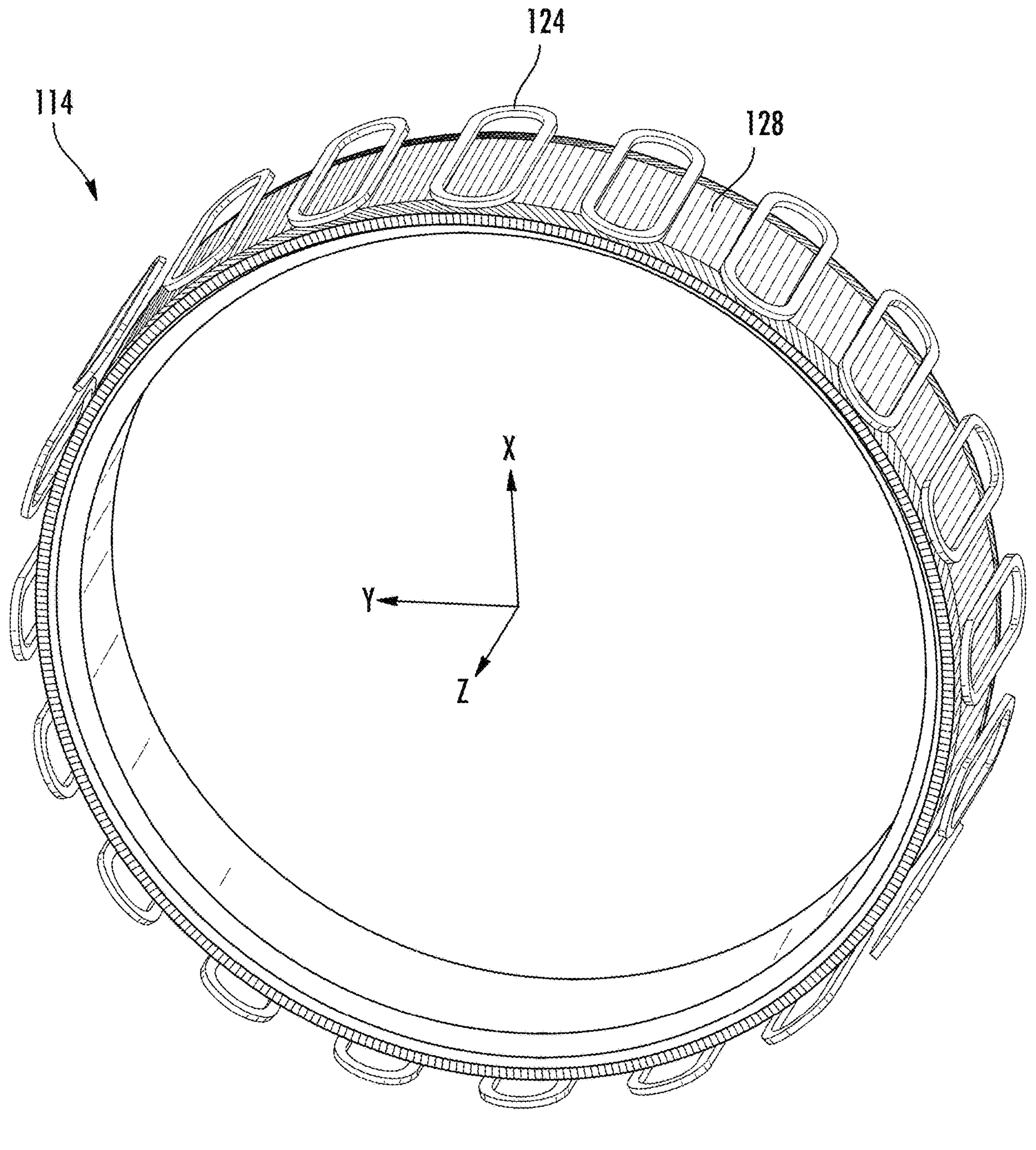
FIG. 4 illustrates a detailed view of an embodiment of a portion of the superconducting generator according to the present disclosure.
Figure 5:
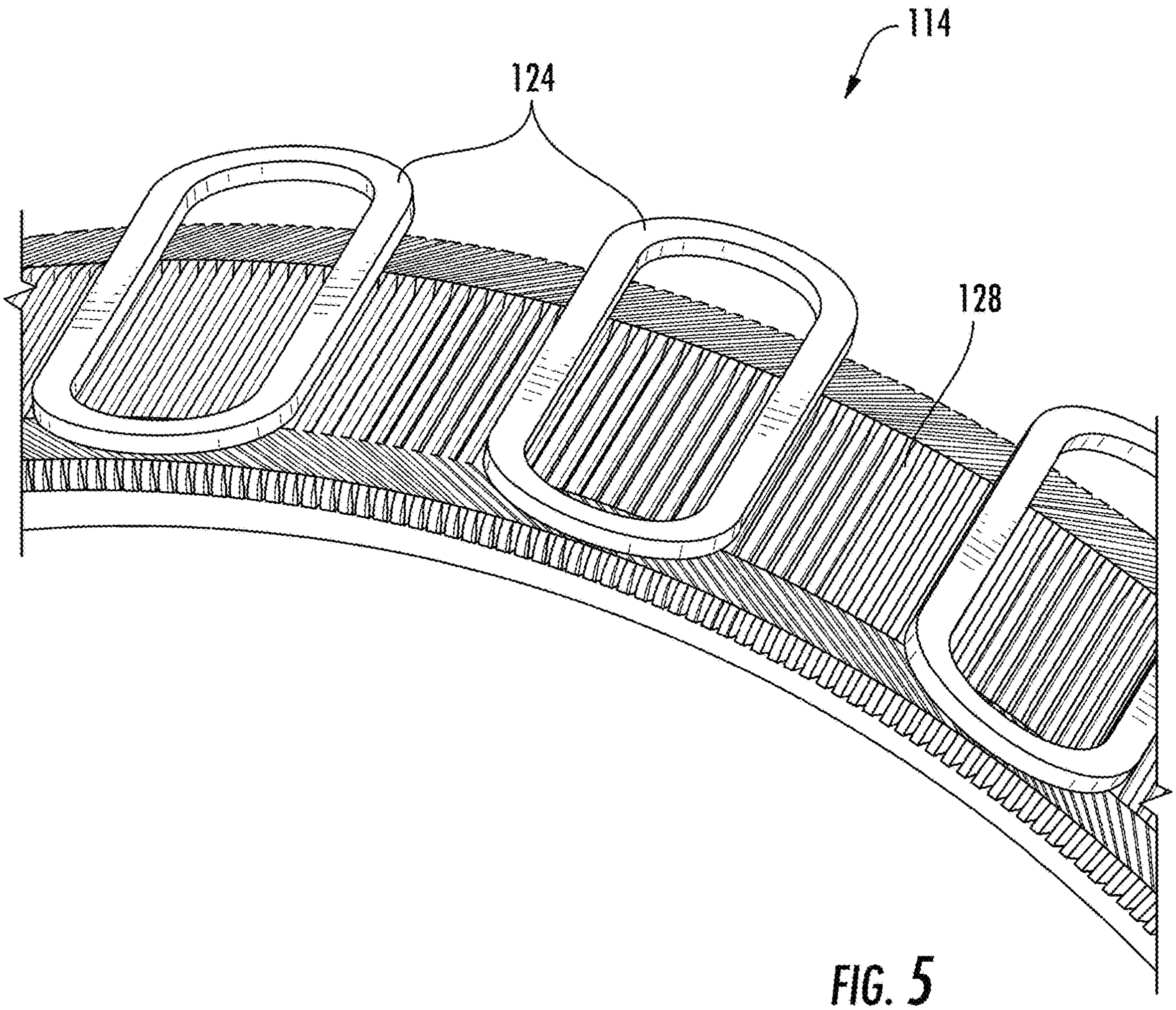
FIG. 5 illustrates a detailed, perspective view of a portion of the superconducting generator of FIG. 4 according to the present disclosure.

Referring now to FIGS. 4-5, various views of multiple embodiments of the superconducting generator 114 according to the present disclosure are illustrated. In particular, FIG. 4 illustrates a detailed view of an embodiment of a portion of the superconducting generator 114 according to the present disclosure; and FIG. 5 illustrates a detailed, perspective view of a portion of the superconducting generator of FIG. 4 according to the present disclosure.

In particular, as shown, the superconducting generator 114 may also include a plurality of void spaces 128, with one of the void spaces 128 being between each of the plurality of superconducting coils 124. As used herein, a void space generally refers to an electromagnetically passive space. Thus, by leaving a void space 128 between each of the superconducting coils 124, a resulting opposite magnetic field (e.g., a second common polarity) may be generated in that void space 128 by the natural law that forces conservation of the magnetic flux produced by the superconducting coils 124. Furthermore, in an embodiment, the second common polarity within the void spaces 128 is the opposite of the first common polarity generated by the superconducting coils 124. Further, in an embodiment, the void space(s) 128 between each of the superconducting coils 124 may be a vacuum, in that the spaces are empty. In another embodiment, the void space(s) 128 may contain air. In still another embodiment, the void space(s) 128 between each of the superconducting coils 124 may be absent of a magnetic material, such as ferromagnetic material, but may contain a non-magnetic structural material.

Thus, in certain embodiments, the magnetic field in the void space described herein is proportional to the total Ampere-turns of the superconducting coils 124. Therefore, to generate the same flux linkage in a consequent pole configuration, each coil 124 would have more turns than a conventional configuration of similar dimensions (in such a way that the total Ampere-turns are similar).

Figure 6A:
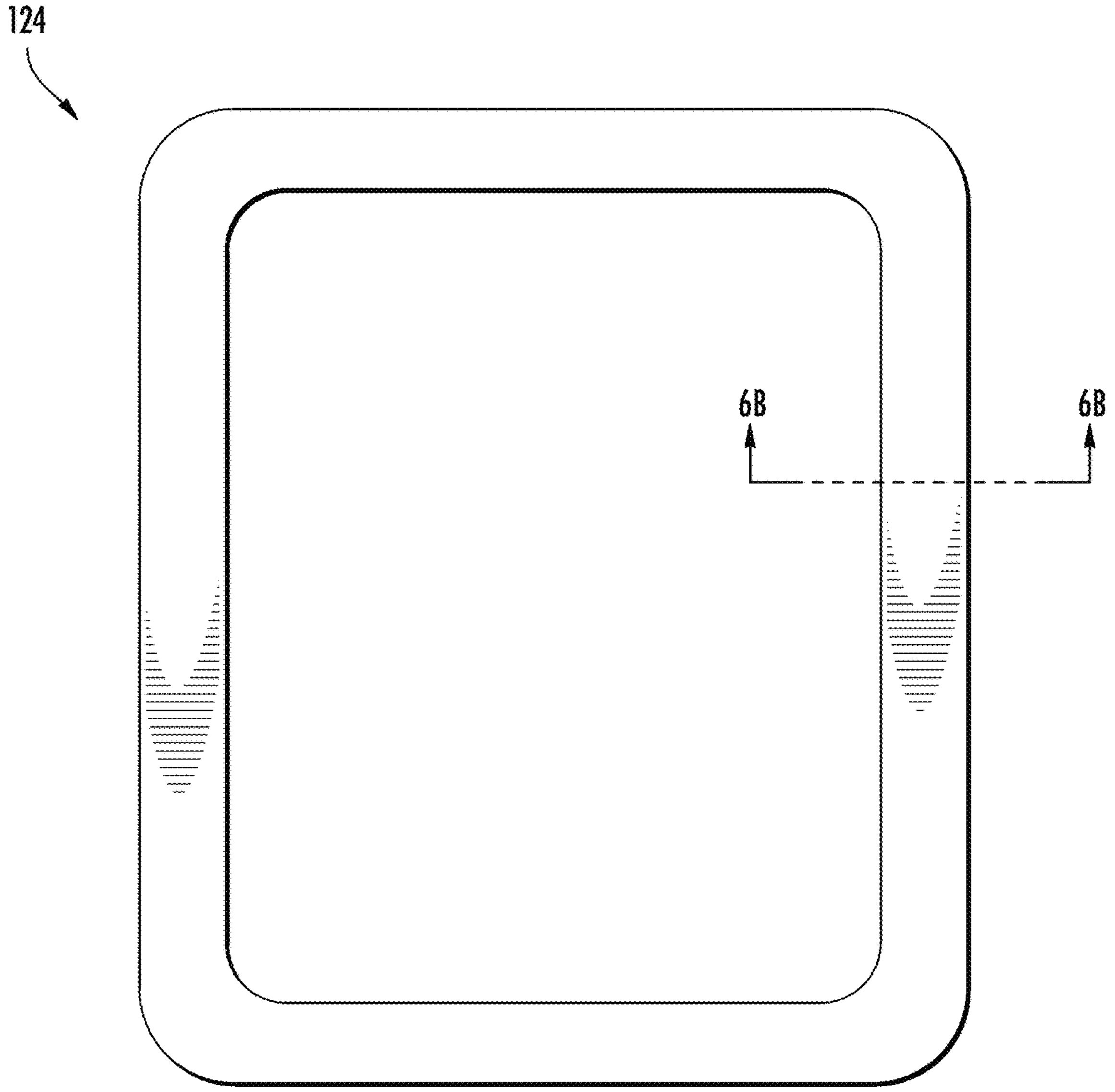
FIGS. 6A-6B illustrate a top view and a cross-sectional view of an embodiment of a superconducting coil according to the present disclosure.
Figure 6B:
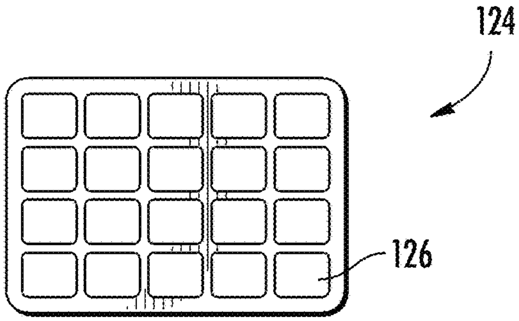

Furthermore, in an embodiment, as shown in FIGS. 6A-6B, the number of coils 124 is a parameter of the machine design, with each coil 124 including a specific number of turns 126, and the number of turns being a parameter of the magnetic design of the machine. In certain embodiments, the number of turns 126 may depend on the superconducting wire being used, the current intended to flow through the coil, and the magnetic field to be produced by the coil. In the illustrated embodiment, for example, the superconducting coil 124 includes twenty turns 126.

Moreover, the superconducting coils 124 may have superconducting properties at low temperature, magnetic field, and current density. Accordingly, the superconducting coils 124 may be operated within one or more low temperature zones appropriate for the selected superconductor. The operating temperature needs to be lower than the critical temperature of superconducting wires. For example, in an embodiment, the operating temperature of the superconducting coils may be equal to or less than to 77 Kelvin (K). As used here, 77 K generally refers to a reference point related to nitrogen transition from gaseous to liquid state at atmospheric pressure. In another embodiment, the operating temperature may be close to 20 Kelvin which is the boiling temperature of liquid hydrogen at atmospheric pressure. In another embodiment, the operating temperature may be close to 4.2 Kelvin which is the boiling temperature of liquid helium at atmospheric pressure.

Accordingly, the superconducting coils 124 carry excitation current, wherein current flowing therethrough produces a magnetic field (e.g., a first common polarity), and the armature coil is connected to the output of the generator 114 (e.g., via output terminals) to conduct an output current and electrical power output. Although several coils are depicted, there may be more or fewer coils 124 and/or windings thereof about the armature 118 and field assembly 120 in various embodiments, e.g., to configure the number of poles of the generator 114 and, thereby, the generating frequency and/or other operating characteristics of the generator 114. The polarity of this magnetic field produced may be configured by setting the flow of the electrical current in a direction. The polarity of the magnetic field may then be switched to an opposing polarity by reversing the flow of the electrical current in an opposite direction. For example, in an embodiment, the polarity of the first common polarity may be set to north as a result of the flow of the electrical current. In another embodiment, the first common polarity may be set to south as a result of the flow of the electrical current.

Figure 7:
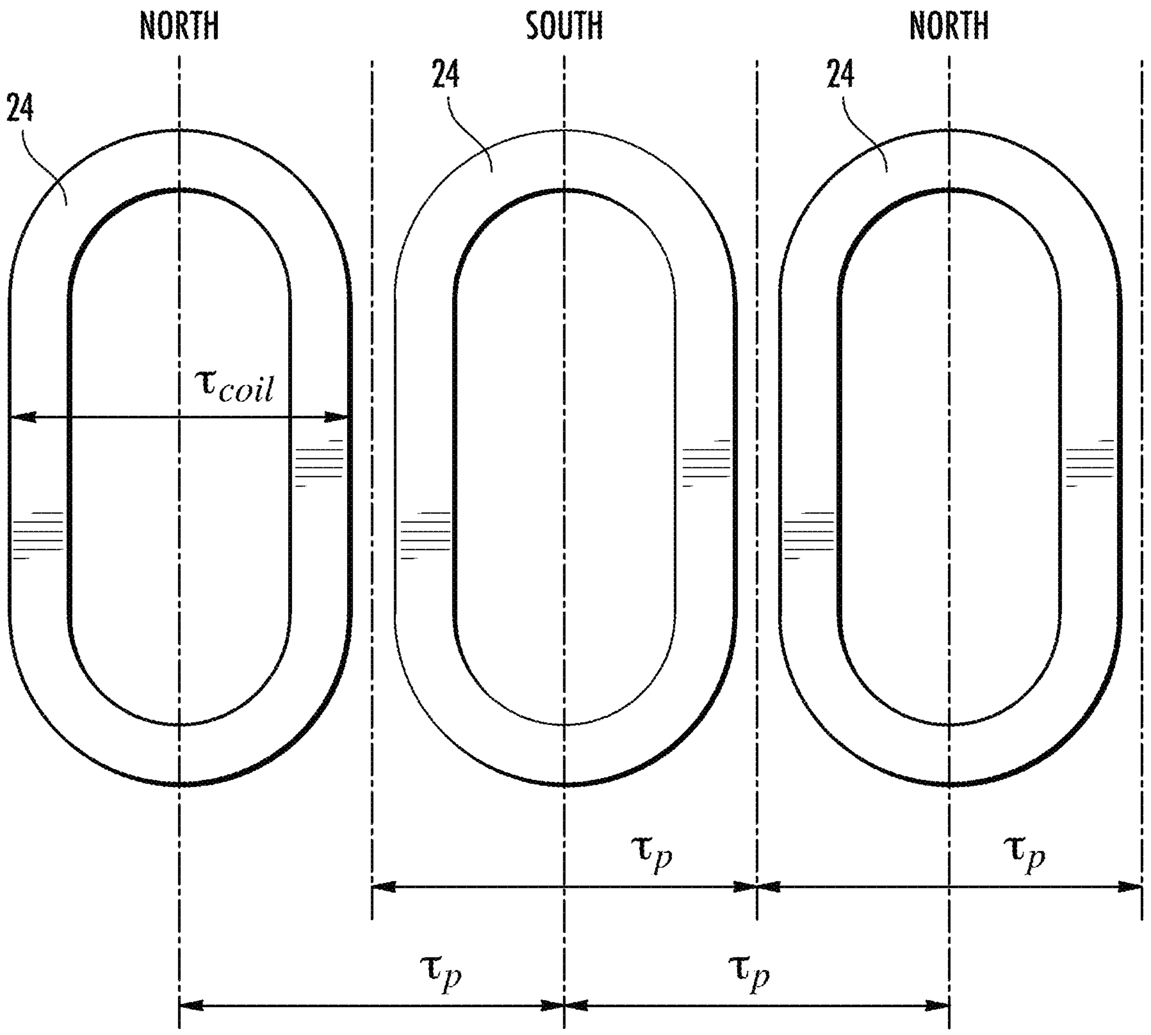
FIG. 7 (PRIOR ART)
FIG. 7 illustrates an arrangement of superconducting coils according to conventional construction.
Figure 8A:
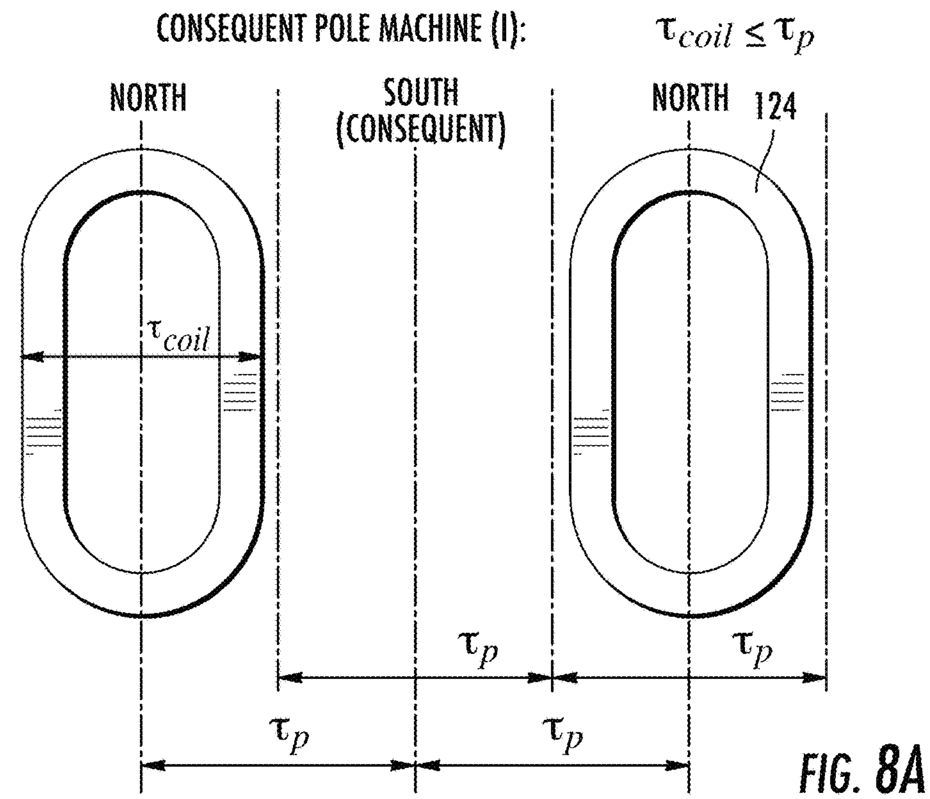
FIGS. 8A and 8B illustrate multiple arrangements of embodiments of superconducting coils according to the present disclosure.
Figure 8B:
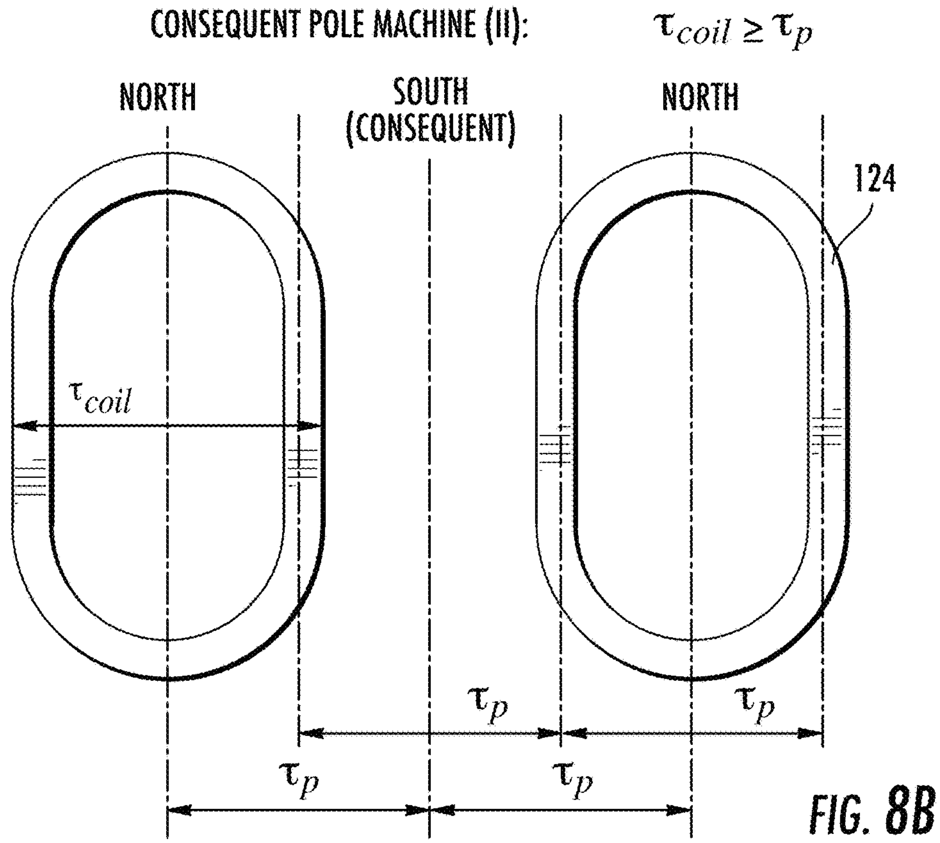

In certain embodiments, the magnetic field generated by the void space(s) 128 and the superconducting coils 124 may be further enhanced by placing the superconducting coils 124 a certain distance from each other. For example, as shown in FIG. 7, an arrangement of superconducting coils 24 is provided according to the conventional construction, whereas FIGS. 8A-8B illustrate multiple arrangements of the superconducting coils 124 according to the present disclosure. Thus, as shown in FIG. 7 illustrating the conventional arrangement, each coil 24 is linked to a pole (north or south). Therefore, the width of each coil (e.g., $\tau_{coil}$) is always less or equal to the pole pitch ($\tau_p$). In contrast, for a consequent pole machine having the superconducting coils 124 of the present disclosure, as shown in FIGS. 8A and 8B, the coil width ($\tau_{coil}$) can be smaller, equal to, or larger than the pole pitch, with the only limitation being $\tau_{coil} \leq 2\tau_p$.

Figure 9A:
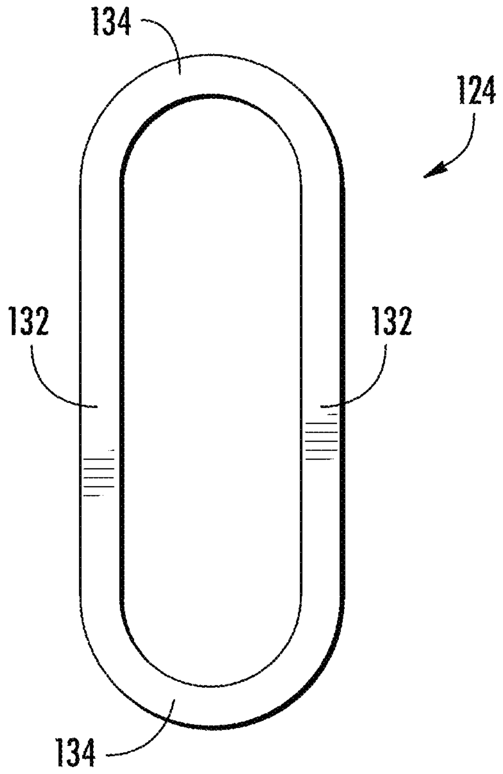
FIGS. 9A, 9B, 9C, and 9D illustrate multiple embodiments of different shapes of superconducting coils according to the present disclosure.
Figure 9B:
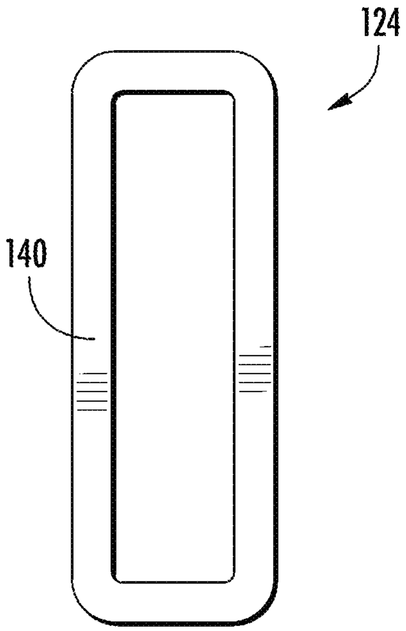
Figure 9C:
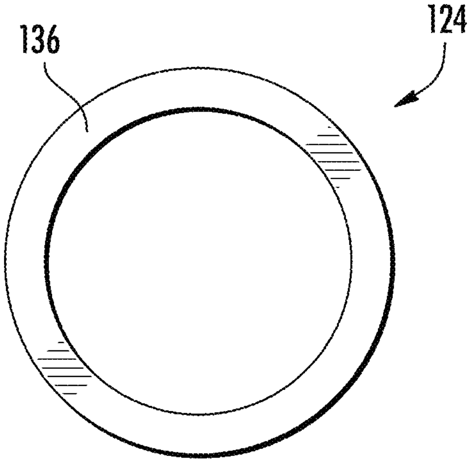
Figure 9D:
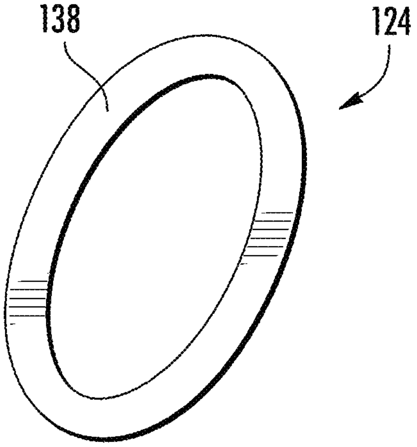

Moreover, as shown in FIGS. 9A-9D, the magnetic field generated by the superconducting coils 124 may be altered by changing the shape of the superconducting coils 124. In such embodiments, changing the shape of the superconducting coils 124 is also configured to alter the shape of the void spaces 128. In particular embodiments, as shown in FIGS. 8A, 8B, 9A, 9C, and 9D, the superconducting coils 124 may have an arcuate shape, such as a racetrack shape (FIG. 9A) with parallel straightaways 132 and curved ends 134. In other embodiments, as shown in FIG. 9B, the superconducting coils 124 may have a generally rectangular shape 140. In further embodiments, for example, as shown in FIGS. 9C-9D, the superconducting coils 124 may have any other suitable arcuate shape, such as a circular shape 136 or a composite of circular arcs of different radii to approximate a racetrack shape. Similarly, in FIG. 9D, the superconducting coils 124 may have an oval shape 138. In another embodiment, the magnetic field may be altered by increasing the size of the superconducting coils 124.

In additional embodiments, the superconducting coils 124 may be constructed of a low-temperature superconducting material, such as niobium-titanium (NbTi), niobium-tin (Nb3Sn), or magnesium-diboride (MgB2), or a high-temperature superconducting material, such as YBCO or ReBCO. Typically, in an embodiment, the armature coils are constructed from copper or aluminum.

Figure 10A:
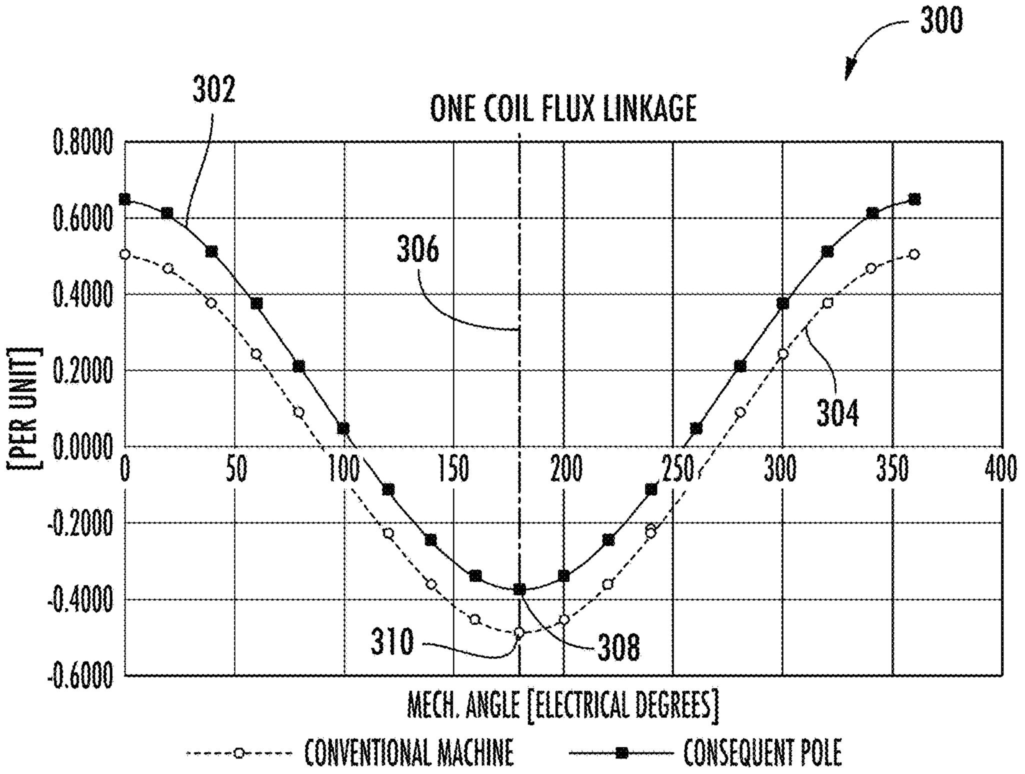
FIGS. 10A and 10B illustrate graphs of an embodiment of a magnetic flux generated by superconducting coils of a superconducting generator according to the present disclosure, particularly illustrating the similarity in peak magnetic flux linkage between a consequent pole superconducting coil arrangement with a void between the coils compared to a conventional superconducting coil arrangement.
Figure 10B:
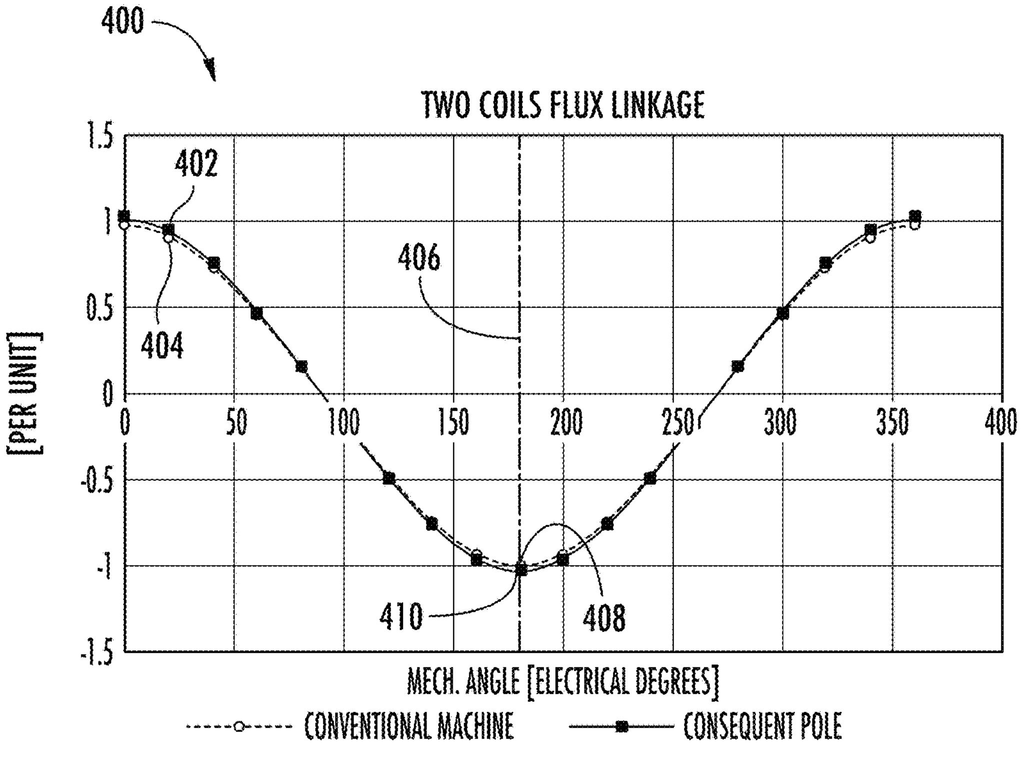

Referring now to FIGS. 10A and 10B, various graphs of waveform charts comparing magnetic flux linkage of an armature winding 128 within a superconducting generator 114 to illustrate benefits of the present disclosure are provided. In particular, FIG. 10A illustrates a waveform graph 300 of magnetic flux linkage corresponding to one armature coil 128 flux linkage for a superconducting machine according to the present disclosure, such as superconducting generator 114 that includes a plurality of superconducting coils 124 having void spaces 128 therebetween, contrasted with a conventional superconducting generator with a similar geometry and the same number of Ampere-turns but twice the number of superconducting coils. Thus, as shown, variations in the levels of magnetic flux may be achieved through the variation of the mechanical angle of the superconducting coils 124 relative to the armature windings 128. Therefore, by varying the mechanical angle, a waveform of a conventional superconducting pole 302 and a waveform of a consequent pole 304 may be produced. Further, a peak magnetic flux 308 for a conventional superconducting coil and a peak magnetic flux 310 for a consequent pole may be defined by finding a mechanical angle corresponding to a peak mechanical angle 306.

For example, in an embodiment, as shown, a peak mechanical angle 306 may be at or greater than 90 electrical degrees and at or less than 270 electrical degrees. In such embodiments, as shown, peak magnetic flux 308 for a conventional superconducting coil may be at or lesser than −0.4 per unit (pu). In an alternative embodiment, as shown, peak magnetic flux 310 for a consequent pole may be at or lesser than −0.4 pu.

Thus, as shown by comparing FIG. 10A to FIG. 10B, an insignificant difference in peak magnetic flux is seen when comparing the total flux linkage of two armature coils 128 connected in series under adjacent field poles for a conventional superconducting machine and a superconducting machine with a void space in between each of the superconducting coils according to the present disclosure.

Figure 11:
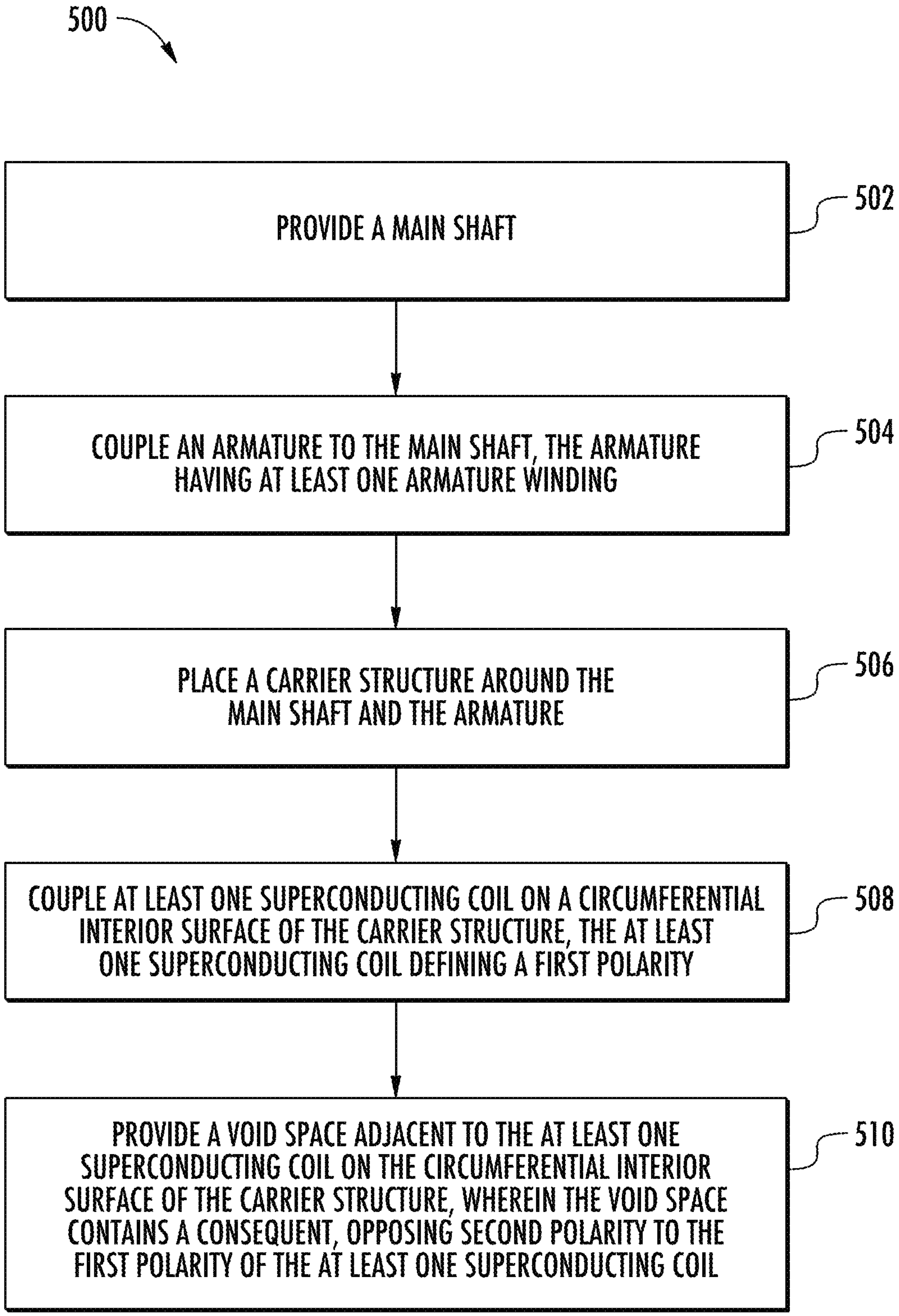
FIG. 11 illustrates a flow diagram of an embodiment of a method of assembling a superconducting machine according to the present disclosure.

Referring now to FIG. 11, a flow diagram of one embodiment of a method 500 of assembling a superconducting machine is provided. It should be understood that the method 500 may be implemented using, for instance, the superconducting generator 114 of the present disclosure discussed above with references to FIGS. 1-1*re*. FIG. 11 depicts steps performed in a particular order for purposes of illustration and discussion. Those of ordinary skill in the art, using the disclosures provided herein, will understand that various steps of the method 500, or any of the methods disclosed herein, may be adapted, modified, rearranged, performed simultaneously, or modified in various ways without deviating from the scope of the present disclosure.

As shown at (502), the method 500 includes providing a main shaft. As shown at (504), the method 500 includes coupling an armature to the main shaft, the armature having at least one armature winding. As shown at (506), the method 500 includes placing a carrier structure around the main shaft and the armature. As shown at (508), the method 500 includes coupling at least one superconducting coil on a circumferential surface of the carrier structure, the at least one superconducting coil defining a first polarity. As shown at (510), the method 500 includes providing a void space adjacent to the superconducting coil(s) on the circumferential exterior surface of the carrier structure, wherein the void space contains a consequent, opposing second polarity to the first polarity of the at least one superconducting coil.

Various aspects and embodiments of the present disclosure are defined by the following numbered clauses:

Clause 1. A superconducting machine, comprising:
- a main shaft;
- an armature comprising at least one armature winding arranged with respect to the main shaft;
- a carrier structure arranged circumferentially around the main shaft and defining a circumferential surface;
- a plurality of superconducting coils secured to the circumferential surface of the carrier structure, each of the plurality of superconducting coils having a first common polarity; and
- a void space between each of the plurality of superconducting coils, each of the void spaces having a second common polarity, each of the second common polarities being in opposition with the first common polarities.

Clause 2. The superconducting machine of clause 1, wherein the first common polarities each comprise a north pole and the second common polarities comprise a south pole or vice versa.

Clause 3. The superconducting machine of any of the preceding clauses, wherein each of the plurality of superconducting coils defines a quadrilateral shape.

Clause 4. The superconducting machine of any of the preceding clauses, wherein each of the plurality of superconducting coils defines an arcuate cross-sectional shape.

Clause 5. The superconducting machine of clause 4, wherein the arcuate cross-sectional shapes comprise at least one of a circle, an oval, or a racetrack shape, the racetrack shape defining opposing curved ends with parallel straightaway side portions.

Clause 6. The superconducting machine of clause 5, wherein each of the plurality of superconducting coils defines the racetrack shape, and wherein the void spaces have a width equal to a distance between the parallel straightway side portions of each of the plurality of superconducting coils.

Clause 7. The superconducting machine of clause 6, wherein straightway side portions of adjacent superconducting coils of the plurality of superconducting coils are evenly spaced.

Clause 8. The superconducting machine of clause 6, wherein straightway side portions of each superconducting coil of the plurality of superconducting coils extend beyond the pole boundaries, thereby creating unequal areas for the physical coils and the void spaces.

Clause 9. The superconducting machine of any of the preceding clauses, wherein the void spaces comprise a vacuum.

Clause 10. The superconducting machine of any of the preceding clauses, wherein the void spaces are comprised of non-ferromagnetic material.

Clause 11. The superconducting machine of any of the preceding clauses, wherein each of the plurality of superconducting coils have a coil width, wherein the coil widths are less than, equal to, or greater than a pole pitch of the plurality of superconducting coils, with the coil widths being less than or equal to twice the pole pitch.

Clause 12. A method of assembling a superconducting machine, the method comprising:
- providing a main shaft;
- coupling an armature to the main shaft, the armature having at least one armature winding;
- placing a carrier structure around the main shaft and the armature;
- coupling at least one superconducting coil on a circumferential interior or exterior surface of the carrier structure, the at least one superconducting coil defining a first polarity; and
- providing a void space adjacent to the at least one superconducting coil on the circumferential interior or exterior surface of the carrier structure, wherein the void space contains a consequent, opposing second polarity to the first polarity of the at least one superconducting coil.

Clause 13. The method of clause 12, further comprising coupling a plurality of superconducting coils on the circumferential interior or exterior surface of the carrier structure, the at least one superconducting coil being one of the plurality of superconducting coils, each of the plurality of superconducting coils defining the first polarity.

Clause 14. The method of clauses 12-13, wherein the plurality of superconducting coils are spaced apart via a plurality of void spaces, the void space being one of the plurality of void spaces, each of the plurality of void spaces defining the consequent, opposing second polarity.

Clause 15. The method of clause 14, wherein the first polarities each comprise a north pole and the second polarities comprise a south pole or vice versa.

Clause 16. The method of clause 12-15, wherein each of the plurality of superconducting coils defines a cross-sectional shape, wherein the cross-sectional shapes comprise at least one of a quadrilateral shape or an arcuate shape, the arcuate shape comprising one of a circle, an oval, or a racetrack shape, the racetrack shape defining opposing curved ends with parallel straight-away side portions.

Clause 17. The method of clause 12-16, wherein the void space comprises one of a vacuum or a non-ferromagnetic material.

Clause 18. The method of clause 12-17, wherein each of the plurality of superconducting coils have a coil width, wherein the coil widths are less than, equal to, or greater than a pole pitch of the of plurality of superconducting coils, with the coil widths being less than or equal to twice the pole pitch.

Clause 19. A wind turbine, comprising:

a tower;

a nacelle mounted on the tower;

a rotor coupled to the nacelle, the rotor comprising a rotatable hub and at least one rotor blade secured thereto;

a superconducting generator coupled to the rotor, the superconducting generator comprising:

a main shaft;

an armature comprising at least one armature winding arranged with respect to the main shaft;

a carrier structure arranged circumferentially around the main shaft and defining a circumferential exterior surface;

a plurality of superconducting coils secured to the circumferential interior or exterior surface of the carrier structure, each of the plurality of superconducting coils having a first common polarity; and a void space between each of the plurality of superconducting coils, each of the void spaces having a second common polarity, each of the second common polarities being in opposition with the first common polarities.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A superconducting machine, comprising:

a main shaft;

an armature comprising at least one armature winding arranged with respect to the main shaft;

a carrier structure arranged circumferentially around the main shaft and defining a circumferential surface;

a plurality of superconducting coils secured to the circumferential surface of the carrier structure, each of the plurality of superconducting coils having a first common polarity; and a plurality of void spaces arranged in a circumferentially alternating manner with the plurality of superconducting coils around the main shaft, each of the plurality of void spaces having a second common polarity, each of the second common polarities being in opposition with the first common polarities.

2. The superconducting machine of claim 1, wherein the first common polarities each comprise a north pole and the second common polarities comprise a south pole or vice versa.

3. The superconducting machine of claim 1, wherein each of the plurality of superconducting coils defines a quadrilateral shape.

4. The superconducting machine of claim 1, wherein each of the plurality of superconducting coils defines an arcuate cross-sectional shape.

5. The superconducting machine of claim 4, wherein the arcuate cross-sectional shapes comprise at least one of a circle, an oval, or a racetrack shape, the racetrack shape defining opposing curved ends with parallel straightaway side portions.

6. The superconducting machine of claim 5, wherein each of the plurality of superconducting coils defines the racetrack shape, and wherein each of the plurality of void spaces has a width equal to a distance between the parallel straightway side portions of each of the plurality of superconducting coils.

7. The superconducting machine of claim 6, wherein straightway side portions of adjacent superconducting coils of the plurality of superconducting coils are evenly spaced.

8. The superconducting machine of claim 6, wherein straightway side portions of each superconducting coil of the plurality of superconducting coils extend beyond the pole boundaries, thereby creating unequal areas for the physical coils and the plurality of void spaces.

9. The superconducting machine of claim 1, wherein each of the plurality of void spaces comprise a vacuum.

10. The superconducting machine of claim 1, wherein each of the plurality of void spaces are comprised of non-ferromagnetic material.

11. The superconducting machine of claim 1, wherein each of the plurality of superconducting coils have a coil width, wherein the coil widths are less than, equal to, or greater than a pole pitch of the plurality of superconducting coils, with the coil widths being less than or equal to twice the pole pitch.

12. A method of assembling a superconducting machine, the method comprising:

providing a main shaft;

coupling an armature to the main shaft, the armature having at least one armature winding;

placing a carrier structure around the main shaft and the armature;

coupling a plurality of superconducting coils on a circumferential interior or exterior surface of the carrier structure, each of the plurality of superconducting coils defining a first polarity; and providing a plurality of void spaces arranged in a circumferentially alternating manner with the plurality of superconducting coils around the main shaft, wherein each of the plurality of void spaces contains a consequent, opposing second polarity to the first polarity of the plurality of superconducting coils.

13. The method of claim 12, wherein the first polarities each comprise a north pole and the second polarities comprise a south pole or vice versa.

14. The method of claim 12, wherein each of the plurality of superconducting coils defines a cross-sectional shape, wherein the cross-sectional shapes comprise at least one of a quadrilateral shape or an arcuate shape, the arcuate shape comprising one of a circle, an oval, or a racetrack shape, the racetrack shape defining opposing curved ends with parallel straightaway side portions.

15. The method of claim 12, wherein each of the plurality of void spaces comprises one of a vacuum or a non-ferromagnetic material.

16. The method of claim 12, wherein each of the plurality of superconducting coils have a coil width, wherein the coil widths are less than, equal to, or greater than a pole pitch of the plurality of superconducting coils, with the coil widths being less than or equal to twice the pole pitch.

17. A wind turbine, comprising:
- a tower;
- a nacelle mounted on the tower;
- a rotor coupled to the nacelle, the rotor comprising a rotatable hub and at least one rotor blade secured thereto;
- a superconducting generator coupled to the rotor, the superconducting generator comprising:
  - a main shaft;
  - an armature comprising at least one armature winding arranged with respect to the main shaft;
  - a carrier structure arranged circumferentially around the main shaft and defining a circumferential exterior surface;
  - a plurality of superconducting coils secured to the circumferential interior or exterior surface of the carrier structure, each of the plurality of superconducting coils having a first common polarity; and
  - a plurality of void spaces arranged in a circumferentially alternating manner with the plurality of superconducting coils around the main shaft, each of the plurality of void spaces having a second common polarity, each of the second common polarities being in opposition with the first common polarities.

* * * * *